United States Patent [19]

Larson et al.

[11] Patent Number: 5,305,865
[45] Date of Patent: Apr. 26, 1994

[54] ROTOR FOR ELECTROMAGNETIC COUPLING

[75] Inventors: Paul A. Larson, Belvidere, Ill.; James A. Pardee; Robert L. Stibbe, both of Janesville, Wis.

[73] Assignee: Dana Corporation, Toledo, Ohio

[21] Appl. No.: 26,995

[22] Filed: Mar. 5, 1993

[51] Int. Cl.5 .................... F16D 27/10; F16D 27/14
[52] U.S. Cl. ................ 192/107 R; 192/84 C; 335/281; 335/296
[58] Field of Search .............. 192/84 C, 107 R; 335/281, 296

[56] References Cited

U.S. PATENT DOCUMENTS

| | | | |
|---|---|---|---|
| 2,729,318 | 1/1956 | Harter | 192/84 C |
| 2,860,403 | 11/1958 | Meyer | 192/84 C X |
| 3,712,439 | 1/1973 | Schacher et al. | 192/84 C |
| 5,036,964 | 8/1991 | Booth et al. | 192/84 C |
| 5,123,157 | 6/1992 | Cerny | 192/84 C X |
| 5,125,255 | 6/1992 | Brown et al. | 72/334 |
| 5,137,132 | 8/1992 | Cerny | 192/84 C |

FOREIGN PATENT DOCUMENTS 0215962  4/1987  European Pat. Off. .......... 192/84 C Primary Examiner—Rodney H. Bonck
Attorney, Agent, or Firm—Leydig, Voit & Mayer

[57] ABSTRACT

A rotor for a six-pole electromagnetic clutch includes an outer pole ring and an axially facing disc. The disc is formed with two circumferentially extending and radially spaced rows of circumferentially spaced slots, there being short circumferentially extending bridges between adjacent slots in each row. To strengthen the bridges against failure under high load and heavy wear conditions, a stainless steel reinforcing ring is brazed to the outer pole ring and the disc and transmits torque between the two. The outer edge of the disc thus may be spaced radially inwardly from the outer pole ring to establish an annular air gap which coacts with the two rows of slots to enable the rotor to possess the requisite magnetic characteristics to function in a six-pole clutch.

6 Claims, 2 Drawing Sheets

ROTOR FOR ELECTROMAGNETIC COUPLING

BACKGROUND OF THE INVENTION

This invention relates to a rotor for an electromagnetic coupling such as an electromagnetic clutch or brake. Rotors of the same general type of that of the present invention are disclosed in Booth et al U.S. Pat. No. 5,036,964 and Brown et al U.S. Pat. No.5,125,255. The Booth et al patent also discloses one version of an electromagnetic clutch with which the rotor may be used.

A clutch rotor is made of low magnetic reluctance material and typically includes an inner hub, an axially facing disc formed integrally with and projecting radially outwardly from the hub, and an outer pole ring or flange at the outer periphery of the disc. The outer flange either defines or supports a pulley which coacts with a belt for driving the rotor. In the rotor disclosed in the Booth et al patent, the outer flange is brazed, welded or otherwise secured to the outer periphery of the disc while, in the rotor disclosed in the Brown et al patent, the outer flange is formed integrally with the outer periphery of the disc.

The electromagnetic clutch disclosed in the Booth et al clutch is a six-pole clutch which is capable of developing relatively high torque even though the clutch is comparatively compact in a radial direction. The rotor disclosed in the Brown et al patent also is for use with a six-pole clutch. Typically, a rotor for a six-pole clutch is made by forming three circumferentially extending and radially spaced rows of circumferentially spaced slots through the disc of the rotor, there being relative narrow connecting bridges between the slots of each row. The slots form air gaps of high magnetic reluctance in the disc and, when the rotor includes three radially spaced rings of air gaps, the rotor possesses the necessary magnetic characteristics to cause the clutch to be a high torque six-pole clutch.

A rotor with three radially spaced rows of circumferentially spaced slots functions adequately in many applications of the clutch. In certain high inertia applications, however, such as where the clutch is being used to drive an engine cooling fan of large diameter, the rotor is subjected to high bending forces and to high wear. Under such conditions, the comparatively weak bridges between the slots tend to shear and produce failure of the rotor.

SUMMARY OF THE INVENTION

The general aim of the present invention is to reinforce a rotor of the above general type in such a manner as to strengthen the bridges between the slots and prevent premature failure of the rotor while maintaining the high torque capability of the clutch.

A more detailed object of the invention is to achieve the foregoing by brazing or otherwise securing a reinforcing ring of high magnetic reluctance material to the non-working face of the rotor disc so as to strengthen the bridges and reduce the tendency of the bridges to shear or bend. To provide sufficient area for securely brazing the reinforcing ring to the rotor disc, only two radially spaced rows of slots are formed in the disc, thereby increasing the available braze area, and yet the rotor is maintained for use in a six-pole clutch by connecting the outer flange of the rotor to the reinforcing ring and by spacing the outer periphery of the disc radially inwardly from the outer flange so as to provide the third annular air gap required for a six-pole clutch.

The invention also resides in the use of a reinforcing ring which is stamped from metal in a fast, simple and economical manner and which, as stamped, is configured to conform to the non-working face of the rotor without need of performing secondary machining operations on the ring.

These and other objects and advantages of the invention will become more apparent from the following detailed description when taken in conjunction with the accompanying drawings.

DETAILED DESCRIPTION OF THE PREFERRED EMBODIMENT

Figure 1:
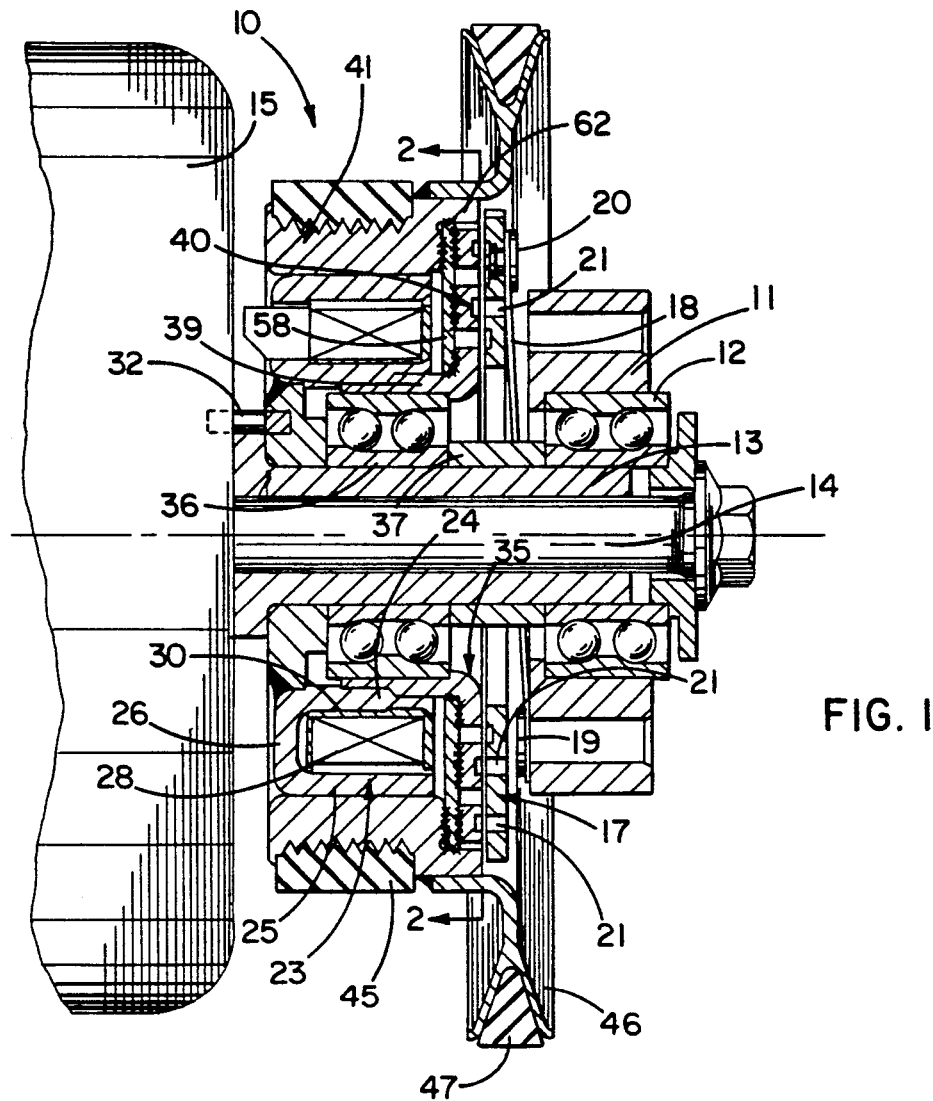
FIG. 1 is a cross-sectional view of an electromagnetic clutch equipped with a new and improved rotor incorporating the unique features of the present invention.

For purposes of illustration, the invention has been shown in the drawings in conjunction with an electromagnetic coupling 10 which could be a brake but which herein is in the form of an electromagnetic clutch. The clutch 10 which has been illustrated is used to drive a large (e.g., 3' diameter) cooling fan (not shown) of an internal combustion engine, the cooling fan being supported on a hub 11 which constitutes the output member of the clutch. The hub is mounted for rotation by a bearing 12 supported on a central sleeve 13. A screw 14 extends through the sleeve and secures the clutch to a fixed component 15 of the engine.

An armature 17 is connected to rotate with and move axially relative to the output hub 11. The armature is formed by a flat circular disc made of low magnetic reluctance material such as AISI 1010 steel. Three angularly spaced leaf springs 18 (only one of which is visible) are connected between the output hub 11 and the armature 17, one end of each spring being riveted to the output hub as indicated at 19. The other end of each spring is riveted to the armature 17 as indicated at 20. In a well known manner, the springs couple the armature and the output hub for rotation in unison while supporting the armature to move axially toward and away from the output hub.

For a purpose to be explained subsequently, two circumferentially extending and radially spaced rows of circumferentially spaced slots 21 (FIG. 3) are formed through the armature. Reference may be made to the aforementioned Booth et al patent for a more detailed disclosure of a slotted armature.

The clutch 10 further includes an electromagnet which is formed in part by an annular magnet core 23 of substantially U-shaped radial cross-section and having an inner pole ring 24 and an outer pole ring 25. Formed integrally with and extending radially between the rear ends of the pole rings is a bridge 26. A multiple turn winding 28 is secured within a U-shaped channel 30 which, in turn, is fastened to the outer side of the inner pole ring 24. The magnet core 23 is held against rotation relative to the engine component 15 by a pin 32.

A rotary member or rotor 35 is journaled on the sleeve 13 by a bearing 36 which is separated from the bearing 12 by a spacer 37. The rotor includes an inner pole piece formed by an annular hub member 39 fixed to the outer race of the bearing 36, a disc member 40 formed integrally with and projecting radially from the forward end of the hub, and an outer pole piece member 41 located adjacent the outer periphery of the disc 40. The hub, the disc and the outer pole piece of the rotor also are made of material having low magnetic reluctance and may be made from the same type of steel as the armature 17. During the manufacturing process, a concave radius 43 (FIG. 5) is conventionally formed at the junction of the hub 39 and the inner margin of the rear or non-working face of the disc 40.

Figure 3:
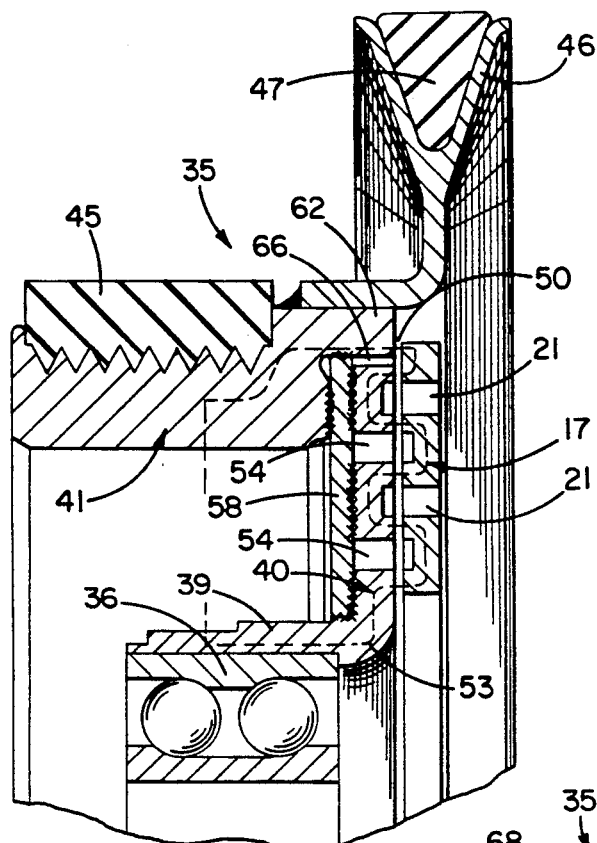
FIG. 3 is an enlarged view of a portion of the rotor shown in FIG. 1.

Several axially spaced grooves extend circumferentially around the outer pole piece 41 of the rotor 35 and interfit with complemental ribs on the inner side of a poly-V drive belt 45 (FIG. 3). In addition, a separate pulley 46 is fastened rigidly to the forward end portion of the outer pole piece 41 and is adapted to be driven by a conventional V-belt 47.

When the winding 28 is in a de-energized state, the leaf springs 18 keep the armature 17 spaced axially from the forward or working face of the disc 40 of the rotor 35 so that a narrow axial air gap 50 (FIGS. 3-5) is defined between the armature and the rotor disc. Under these circumstances, the clutch 10 is disengaged so that the rotor, upon being driven by the belt 45 or the belt 47, rotates relative to the armature without transmitting torque to the armature and the fan hub 11.

Figure 2:
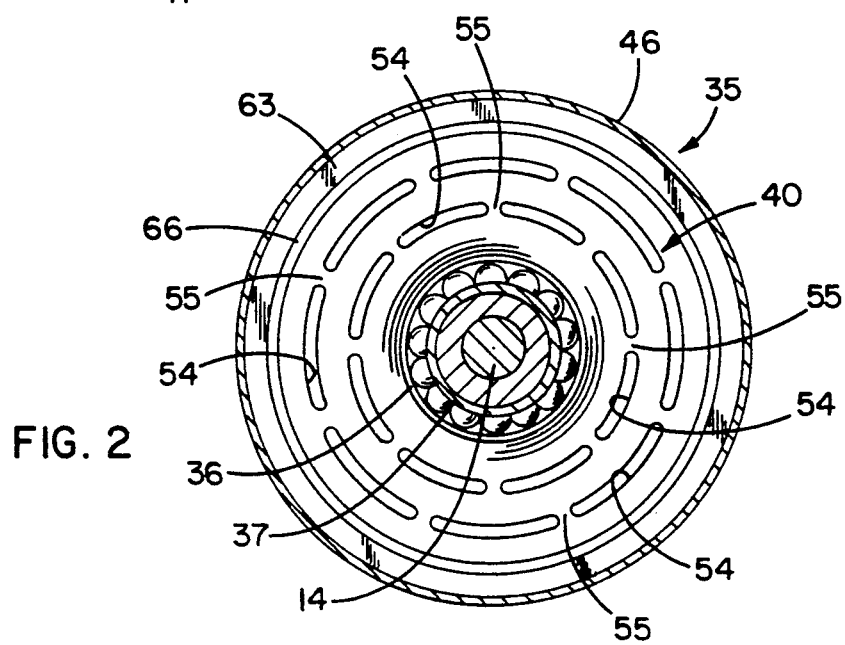
FIG. 2 is a reduced cross-section taken substantially along the line 2—2 of FIG. 1.

When the winding 28 is energized, magnetic flux threads a path indicated generally by the dotted line 53 (FIGS. 3-5) and zig-zags back and forth across the axial air gap 50 between the armature 17 and the rotor disc 40. The flux magnetically attracts the armature to the rotor disc and the two become magnetically and frictionally coupled so as to cause the output hub 11 to rotate in unison with the rotor 35 and thereby drive the cooling fan. In order to cause the flux to zig-zag across the air gap, the rotor disc 40 is formed with circumferentially extending and radially spaced rows of circumferentially spaced slots 54 (FIG. 2). The slots in each row are separated from one another by circumferentially spaced bridges 55.

When the clutch 10 is driving an output member such as a relatively large diameter cooling fan, the rotor 35, upon engagement of the clutch, must pick up and overcome a comparatively high inertia load. In addition, the rotor is subjected to pulsating forces during steady state operation. As a result of high loads and wear, the relatively weak bridges 55 between the slots 54 in the rotor disc 40 have a tendency to fail in shear.

According to the present invention, the bridges 55 of the rotor disc 40 are strengthened against failure and yet, at the same time, the rotor 35 is constructed in such a manner as to enable the clutch 10 to be a comparatively radially compact package and to operate as a relatively high torque six-pole clutch. In carrying out the invention, a reinforcing ring 58 made of a material having high magnetic reluctance is secured to the rear or non-working face of the rotor disc 40 and to the outer pole piece 41 of the rotor. As will become apparent subsequently, the ring strengthens the bridqes 55 of the rotor disc and allows the clutch to operate as a six-pole clutch with only two radially spaced rows of slots 54 in the disc 40.

In this particular instance, the reinforcing ring 58 is made of stainless steel although the ring could be made of other structurally strong material of high magnetic reluctance. The ring is secured to the non-working face of the rotor disc 40 and, together with the outer peripheral portion of the disc, is received in an annular pocket in the outer pole piece 41 of the rotor 35. The pocket is defined by an axially facing wall 60 (FIG. 4) of the pole piece and by a radially inwardly facing wall 61, the latter being defined by the inner surface of an annular flange 62 projecting axially from the outer margin of the wall 60 and having an axially facing annular end 63.

Figure 4:
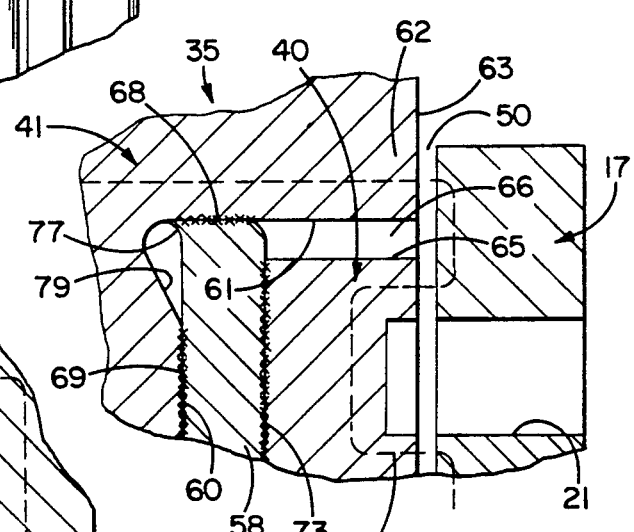
FIG. 4 is an enlarged view of a portion of the rotor shown in FIG. 3.
Figure 5:
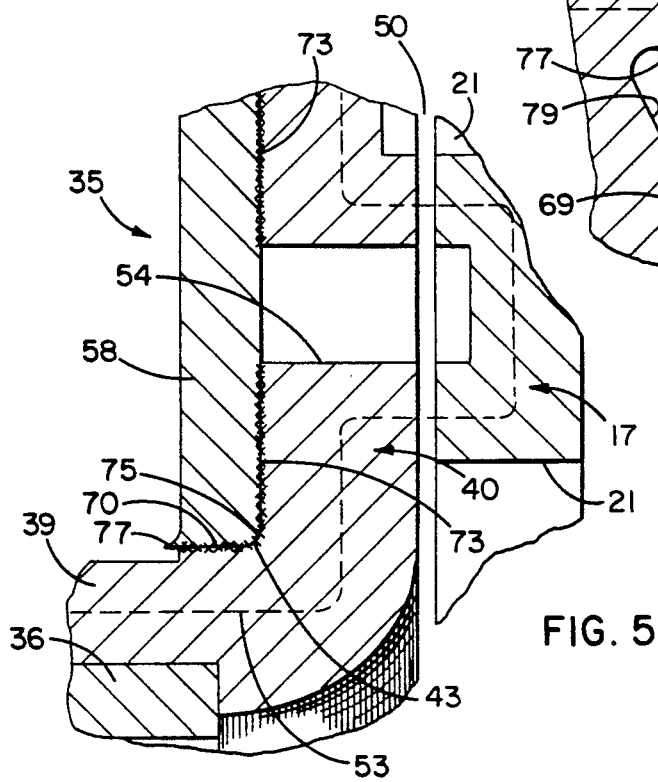
FIG. 5. is an enlarged view of another portion of the rotor shown in FIG. 3.

As shown most clearly in FIG. 4, the outer peripheral portion of the rotor disc 40 is located in the pocket with the non-working face of the disc spaced axially from the wall 60 and with the outer periphery 65 of the disc spaced radially inwardly from the wall 61 and separated therefrom by a narrow annular air gap 66. The reinforcing ring 58 is sandwiched between the non-working face of the disc 40 and the axially facing wall 60 and extends radially along the non-working face from the hub 39 to the radially inwardly facing wall 61. Thus, the inner edge of the ring is in encircling engagement with the hub 39 while the outer edge of the ring is closely adjacent the radially inwardly facing wall 61. A braze joint 68 secures the outer edge of the ring 58 to the radially inwardly facing wall 61. An additional braze joint 69 secures the rear face of the outer peripheral portion of the ring to the axially facing wall 60. Accordingly, the ring is connected to rotate with the outer pole piece of the rotor. The inner edge of the ring is secured to the hub 39 by a braze joint 70 (FIG. 5).

As pointed out above, the rotor disc 40 is formed with only two radially spaced rows of circumferentially spaced slots 54, this being in contrast to the conventional practice of forming three rows of slots in the rotor of a six-pole clutch. Because the disc is formed only with two rows of slots 54, the rows may be located further outwardly in a radial direction from the hub 39 so as to leave relatively large surface areas between the hub and the inner row of slots, between the two rows of slots and between the outer row of slots and the outer edge of the disc. Such large surface areas are used as areas to establish strong braze joints 73 (FIGS. 4 and 5) between the non-working face of the disc 40 and the opposing face of the reinforcing ring 58. If a rotor disc of the same diameter were formed with three rows of slots as conventionally taught, for example, by the aforementioned Brown et al patent, the surface areas available for brazing the ring to the disc would not be sufficient to establish strong enough braze joints to sustain the torque and bending loads imposed on the disc.

The reinforcing ring 58 is stamped from a sheet of stainless steel by a conventional and economical stamping process using a punch and die. During such a process, the inner and outer peripheral edges of one side of the ring are inherently convexly radiused as indicated at 75 in FIG. 5 as a result of so-called die roll or shear which occurs as the ring is punched from the sheet. Advantageously, the die roll is controlled so that the convex radius 75 on the inner periphery of the ring 58 coincides with the concave radius 43 at the junction of the hub 39 and the disc 40. As a result of the two coinciding radii, the reinforcing ring may be placed in close face-to-face relation with the non-working face of the disc to enable very strong braze joints 73 to be produced.

When the reinforcing ring 58 is stamped from the stainless steel sheet, annular burrs 77 (FIGS. 4 and 5) are formed on and protrude axially from the inner and outer peripheries of the ring on the side of the ring opposite the side with the convex radius 75. To allow the ring to be used as stamped and without need of removing the outer burr by a grinding operation or the like, an annular groove 79 (FIG. 4) is formed at the junction of the walls 60 and 61 of the ring-receiving pocket. When the ring is placed in the pocket, the groove 79 receives and accommodates the outer burr 77 as shown in FIG. 4 and allows the rear surface of the ring to lie in flat face-to-face engagement with the wall 60. The inner burr 77 simply projects rearwardly adjacent the hub 39.

To summarize, energization of the winding 28 produces magnetic flux which threads along the path 53 (FIG. 3) to engage the clutch 10 by attracting the armature 17 into engagement with the rotor 35. Specifically, the flux threads a path extending from the inner pole ring 24 of the magnetic core 23 to the inner pole piece or hub 39 of the rotor 35. The inner row of slots 54 in the rotor disc causes the flux to cross over to the armature 17 via the axial air gap 50 between the armature and the rotor disc 40. Then, the inner row of slots 21 in the armature causes the flux to thread reversely across the air gap 50 to the rotor disc 40, whereupon the outer row of slots 54 in the disc causes the flux to travel back across the air gap to the armature 17. Thereafter, the outer row of slots 21 in the armature causes the flux to once again thread reversely across the air gap 50 to the rotor disc 40. Upon encountering the annular air gap 66 between the outer periphery 65 of the rotor disc 40 and the radially inwardly facing wall 61, the flux again is forced to thread across the axial air gap 50 to the armature 17. Finally, the flux threads reversely across the air gap 50 to the flange 62 of the outer pole piece 41, whereupon the flux completes its path by threading to the outer pole ring 25 of the magnet core 23 and thence to the inner pole ring 24 thereof via the bridge 26. Accordingly, the flux cuts across the axial air gap 50 six times thus making the clutch 10 a six-pole clutch. This is achieved by forming only two rows of radially spaced slots 54 in the rotor disc 40, by establishing an annular air gap 66 between the outer periphery 65 of the rotor disc and the inwardly facing wall 61 of the outer pole piece 41 and by using the reinforcing ring 58 to transmit torque from the pole piece to the rotor disc. As pointed out above, the incorporation of only two rows of slots 54 in the rotor disc 40 leaves sufficient surface area on the disc to establish strong braze joints 73 between the disc and the reinforcing ring 58.

By virtue of the rotor disc 40 being reinforced by the ring 58, strength is imparted to the bridges 55 between the slots 54 so that the bridges are less likely to fail when the clutch 10 is engaged to pick up a load with comparatively high inertia and when the rotor disc 40 is reduced in axial thickness due to wear. The convex radius 75 inherently formed on the forward side of the ring 58 during stamping allows the latter to be placed flat against the non-working face of the rotor disc to help establish strong braze joints 73 while the annular groove 79 accommodates the outer burr 77 on the opposite side of the ring so as to enable use of the ring in an as-stamped condition.

We claim:

1. A rotor for an electromagnetic coupling, said rotor comprising first and second annular members made of material having low magnetic reluctance, said first annular member having an annular pocket defined by an axially facing wall having an outer margin and by a radially inwardly facing wall, said radially inwardly facing wall being defined by the inner surface of an annular flange projecting axially from the outer margin of said axially facing wall and having an axially facing end, said second annular member comprising a hub located within said first annular member in radially spaced relation therewith and further comprising a disc formed integrally with and projecting radially outwardly from said hub, said disc having an outer periphery, having an axially facing working face and having an oppositely facing non-working face, at least one circumferentially extending row of circumferentially spaced slots formed through said disc to define magnetic poles on the working face of the disc, there being intervening bridges between said slots, said disc being located in said pocket with the non-working face of the disc spaced axially from the axially facing wall of the pocket and with the outer periphery of the disc spaced inwardly from the radially inwardly facing wall of said pocket by a narrow annular air gap, said air gap causing an additional magnetic pole to be defined on the end of said flange, a ring made of material having high magnetic reluctance and sandwiched between the non-working face of said disc and the axially facing wall of said pocket, means securing said ring rigidly to the non-working face of said disc and to at least one of said walls of said pocket, said ring extending radially and circumferentially along substantially all of the non-working face of said disc and serving to structurally reinforce the disc and particularly the bridges between said slots.

2. A rotor as defined in claim 1 in which there is a second circumferentially extending row of circumferentially spaced slots formed through said disc and spaced radially from said first row so as to define at least one additional magnetic pole on the working face of the disc.

3. A rotor as defined in claim 1 in which a circumferentially extending groove is formed in said pocket at the junction of said axially facing wall and said radially inwardly facing wall, there being a generally annular burr projecting axially from said ring adjacent the outer periphery thereof, said burr being received in said groove.

4. A rotor as defined in claim 3 in which the junction between said hub and the non-working face of said disc is formed with a concave radius, said ring having an inner periphery, having an axially facing face and having a convex radius at the junction of said inner periphery and said axially facing face, said convex radius being seated against said concave radius.

5. A rotor as defined in claim 1 in which the junction between said hub and the non-working face of said disc is formed with a concave radius, said ring having an inner periphery, having an axially facing face and having a convex radius at the junction of said inner periphery and said axially facing face, said convex radius being seated against said concave radius.

6. A rotor for a six-pole electromagnetic coupling, said rotor comprising first and second annular members made of material having low magnetic reluctance, said first annular member having an annular pocket defined by an axially facing wall having an outer margin and by a radially inwardly facing wall, said radially inwardly facing wall being defined by the inner surface of an annular flange projecting axially from the outer margin of said axially facing wall and having an axially facing end, said second annular member comprising a hub located within said first annular member in radially spaced relation therewith and further comprising a disc formed integrally with and projecting radially outwardly from said hub, said disc having an outer periphery, having an axially facing working face and having an oppositely facing non-working face, two radially spaced and circumferentially extending rows of circumferentially spaced slots formed through said disc to define magnetic poles on the working face of the disc, there being intervening bridges between the slots in each row, said disc being located in said pocket with the non-working face of the disc spaced axially from the axially facing wall of the pocket and with the outer periphery of the disc spaced inwardly from the radially inwardly facing wall of said pocket by a narrow air gap, said air gap causing an additional magnetic pole to be defined on the end of said flange, a ring made of material having high magnetic reluctance and sandwiched between the non-working face of said disc and the axially facing wall of said pocket, means securing said ring rigidly to the non-working face of said disc and to at least one of said walls of said pocket, said ring extending radially and circumferentially along substantially all of the non-working face of said disc and serving to structurally reinforce the disc and particularly the bridges between said slots.

* * * * *